United States Patent
Aggarwal et al.

(10) Patent No.: US 7,216,303 B2
(45) Date of Patent: May 8, 2007

(54) MENU EMULATION FOR CONTENT BROWSER CLIENTS

(75) Inventors: Radhika Aggarwal, Raleigh, NC (US); William H. Krebs, Jr., Cary, NC (US); Elizabeth A. Schreiber, Apex, NC (US); David B. Styles, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 10/041,136

(22) Filed: Jan. 3, 2002

(65) Prior Publication Data

US 2003/0122868 A1    Jul. 3, 2003

(51) Int. Cl.
*G06F 3/00* (2006.01)
*G06F 9/00* (2006.01)

(52) U.S. Cl. .................. 715/825; 715/803; 715/800; 715/843; 715/810

(58) Field of Classification Search ................ 345/526, 345/440, 810, 853, 169, 808, 823, 840; 435/440.1; 707/102, 103 R, 10, 200; 715/803, 800, 715/843, 810, 825
See application file for complete search history.

(56) References Cited

U.S. PATENT DOCUMENTS

| 55,038 | A | * | 5/1866 | Kim ............................ 95/172 |
| 5,710,918 | A | * | 1/1998 | Lagarde et al. ................ 707/10 |
| 5,748,927 | A | * | 5/1998 | Stein et al. .................. 345/711 |
| 5,751,922 | A |   | 5/1998 | Harada ........................ 395/112 |
| 5,805,167 | A | * | 9/1998 | van Cruyningen .......... 715/808 |
| 5,845,122 | A | * | 12/1998 | Nielsen et al. .............. 345/810 |
| 5,911,070 | A | * | 6/1999 | Solton et al. ................ 717/105 |
| 5,918,238 | A | * | 6/1999 | Hayashi ...................... 715/526 |
| 5,930,792 | A |   | 7/1999 | Polcyn ........................... 707/9 |
| 5,986,654 | A | * | 11/1999 | Alexander et al. .......... 715/744 |
| 6,108,673 | A | * | 8/2000 | Brandt et al. ............... 715/505 |
| 6,148,346 | A |   | 11/2000 | Hanson ...................... 709/321 |

(Continued)

OTHER PUBLICATIONS

Thomas Chester and Richard H. Alden, 1997, Sybex, Fourth Edition, p. 19, 21 and 128.*

(Continued)

*Primary Examiner*—Kristine Kincaid
*Assistant Examiner*—Ryan Pitaro
(74) *Attorney, Agent, or Firm*—Gerald R. Woods, Esq.; Steven M. Greenberg, Esq.; Carey Rodriguez Greenberg & Paul LLP

(57) ABSTRACT

A network distributable emulated menu. The menu can include one or more composite images, each image including menu text and a graphical icon, the icon denoting a selectable menu; one or more selectable form-based input elements, each element encapsulating one of the composite images; and a graphical image of a menu structure, the graphical image including at least one form-based input element encapsulating a reference to a composite image of menu text and a graphical icon, the icon denoting at least one of a menu action and a selectable menu. Additionally, the emulated menu can include one or more table cells, each cell containing one of the selectable form-based input elements. Finally, the menu structure can include at least one of a textual menu action, a graphically selectable menu action, and a nested menu structure.

10 Claims, 3 Drawing Sheets

U.S. PATENT DOCUMENTS

| | | | |
|---|---|---|---|
| 6,549,941 B1 * | 4/2003 | Jaquith et al. | 709/219 |
| 6,580,442 B1 * | 6/2003 | Singh et al. | 715/840 |
| 6,857,105 B1 * | 2/2005 | Fox et al. | 715/825 |
| 6,954,903 B2 * | 10/2005 | Richard | 715/760 |
| 7,032,183 B2 * | 4/2006 | Durham | 715/823 |
| 2002/0065846 A1 * | 5/2002 | Ogawa et al. | 707/503 |
| 2002/0091732 A1 * | 7/2002 | Pedro | 707/505 |
| 2002/0122054 A1 * | 9/2002 | Hind et al. | 345/731 |

OTHER PUBLICATIONS

Coldewey, Jens. "Form-Based User Interface-The Architectural Patterns", 1-20, 1997, http://www.riehle.org/community-service/hillside-group/europlop-1997/p9final.pdf.*

"Efficient 3D Buttons in Dynamic Hyper Text Markup Language Pages", Jan. 1998, pp. 695-698.*

"Tables and Buttons how NM and IE handle tables and images",May 5, 2000, pp. 1-4.*

* cited by examiner

MENU EMULATION FOR CONTENT BROWSER CLIENTS

BACKGROUND OF THE INVENTION

1. Technical Field

The present invention relates to rendering user interface elements in a content browser and more particularly to emulating pull-down and pop-up menus in a content browser.

2. Description of the Related Art

Prior to the popularization of the Internet and the subsequent deployment of the World Wide Web, software publishers typically distributed computer applications via storage media such as a computer diskette or compact disc. Initially, such computer applications included underlying program logic, data storage and, optionally, a user interface. Over time, as the processing capabilities of underlying computing devices evolved, increasingly more complex user interfaces were developed for use with corresponding computer applications. In particular, the advent of the graphical user interface (GUI) resulted in an expectation among end users that a computer application include an intuitive and aesthetically pleasing graphical interface through which end users could effectively interact with the computer application.

Recently, given the popularization of the Internet and the World Wide Web, it is no longer reasonable to presume that computer applications are distributed exclusively via disk medium. Rather, in many cases, conventional computer programs are distributed electronically via the Internet. More importantly, however, in many cases computer applications are no longer distributed as stand-alone executable programs. Rather, many computer applications are distributed as Web applications which can include a collection of hypermedia documents such as Web pages which can be viewed in hypermedia content browsers such as Web browsers.

In the case of a Web application, users interact with the underlying program logic not through a traditional GUI, but through a GUI provided by widgets embedded in a hypermedia document displayed in a hypermedia content browser. Unfortunately, Web-based GUIs do not enjoy the same flexibility of the conventional GUI. Specifically, GUI widgets which can be dynamically modified during run-time are not also included as part of a Web-enabled GUI. In fact, fundamental limitations of modern markup languages prohibit software developers from accessing "basic" GUI components such as a drop-down and pop-up menu structures.

Though it is important to be able to emulate traditional application menus in Web applications, such emulation is not easily undertaken. Present solutions address this deficiency by utilizing embedded scripting and program logic requiring advanced processing in the content browser. For instance, it is known to emulate drop-down menus using JavaScript and Dynamic HTML. Still, some conventional Web browsers cannot process JavaScript or Dynamic HTML and are configured only to process basic versions of HTML, such as HTML 3.2. Moreover, the activation of drop-down menus facilitated through JavaScript and Dynamic HTML often require extensive communications between the content browser and content server. Extensive communications between the content server and content browser, however, can detract from the performance of the Web application.

SUMMARY OF THE INVENTION

The present invention is a menu emulation method for use in content browsers which overcomes the deficiencies of the prior art. Specifically, the method can include the steps of encoding a form-submit element with a menu-item description and an associated graphical icon denoting a selectable menu; disposing the encoded form-submit element in network distributable markup and distributing the markup to a content browser. Responsive to a selection of one of the menu-item description and the graphical icon, a graphical menu-structure encoded in at least one additional form-submit element can be further distributed over the network to the content browser.

In the method of the invention, the encoding step can include the step of embedding in a markup representation of the form-submit element, a network reference to a server configured to produce enhanced graphical menu images. In particular, the network reference can include a textual menu-item description and a menu type. Responsive to a selection of the encoded form-submit element embedded in the table cell, a graphical menu-structure encoded in at least one additional form-submit element can be assembled.

Subsequently, the encoded form-submit element embedded in the table cell can be replaced with the graphical menu-structure. Additionally, the table cell can be formatted with a background color which differs from the background colors of other table cells in the table. Notably, the assembling step can include generating a graphical display of a menu-structure, the display including at least one of a textual menu action, a graphically selectable menu action, and a nested menu structure.

In one aspect of the invention, the disposing step can include the step of embedding the encoded form-submit element in network distributable markup defining a table cell in a table; formatting the table cell with a background color matching the background colors of other table cells in the table; and, distributing the markup, upon request, to a content browser. In particular, the disposing step can include embedding the encoded form-submit element in network distributable markup defining a table cell in a table row in a table; further embedding other encoded form-submit elements in other table cells in the table row; and, formatting each the table cell with a first background color.

Likewise, the further distributing step can include detecting a selection of one of the encoded form-submit elements in the row; responsive to the detection, assembling a graphical menu-structure encoded in at least one additional form-submit element; replacing the one of the encoded form-submit elements with the graphical menu-structure; and, formatting a table cell containing the graphical menu-structure with a background color which differs from the background colors of the other table cells in the table row. Finally, the method can further include preserving state information for each encoded form-submit element; and, upon detecting a selection of one of the encoded form-submit elements, identifying graphical menu-structures in the markup from the state information, and removing the graphical menu-structures from the markup except for a graphical menu-structure assembled for the selected encoded form-submit element.

In another aspect of the invention, a menu emulation method can include serving markup to a plurality of content browsers, the markup comprising at least one form-based input element encapsulating a reference to a composite image of menu text and a graphical icon, the icon denoting a selectable menu; receiving an indication from at least one of the content browsers that the form-based input element has been selected; and, responsive to the receipt of the indication, further serving to the at least content browser a graphical image of a menu structure, the graphical image comprising at least one form-based input element encapsulating a reference to a composite image of menu text and a graphical icon, the icon denoting at least one of a menu action and a selectable menu.

In accordance with the inventive arrangements, a network distributable emulated menu can include one or more composite images, each image including menu text and a graphical icon, the icon denoting a selectable menu; one or more selectable form-based input elements, each element encapsulating one of the composite images; and a graphical image of a menu structure, the graphical image including at least one form-based input element encapsulating a reference to a composite image of menu text and a graphical icon, the icon denoting at least one of a menu action and a selectable menu. Additionally, the emulated menu can include one or more table cells, each cell containing one of the selectable form-based input elements. Finally, the menu structure can include at least one of a textual menu action, a graphically selectable menu action, and a nested menu structure.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a menu emulation system and method for use in content browsers. Advantageously, unlike prior art menu rendering systems, in the present invention, menus can be emulated without expending processing resources which otherwise would be expended when using JavaScript, DHTML or such other client side processing technologies. Rather, in the present invention drop-down menus and pop-up menus can be emulated using markup which can be rendered even in skeletal content browsers capable only of processing HTML 3.2.

Specifically, in accordance with the inventive arrangements, submittable form input elements can be encoded in markup and can include composite imagery causing each form input element to appear as a menu entry in a menu. When a form input element is selected, additional imagery can be encoded in replacement markup, the additional imagery causing the selected form input element to appear as a drop-down or pop-up menu. Hence, using minimal client-server communications, a markup-specified user interface can appear to include a fully operational menu bar or pop-up menu without requiring the use of client side processing technologies such as JavaScript. Rather, even a basic HTML 3.2 compliant content browser can render markup configured to emulate a fully operational menu bar.

Figure 1:
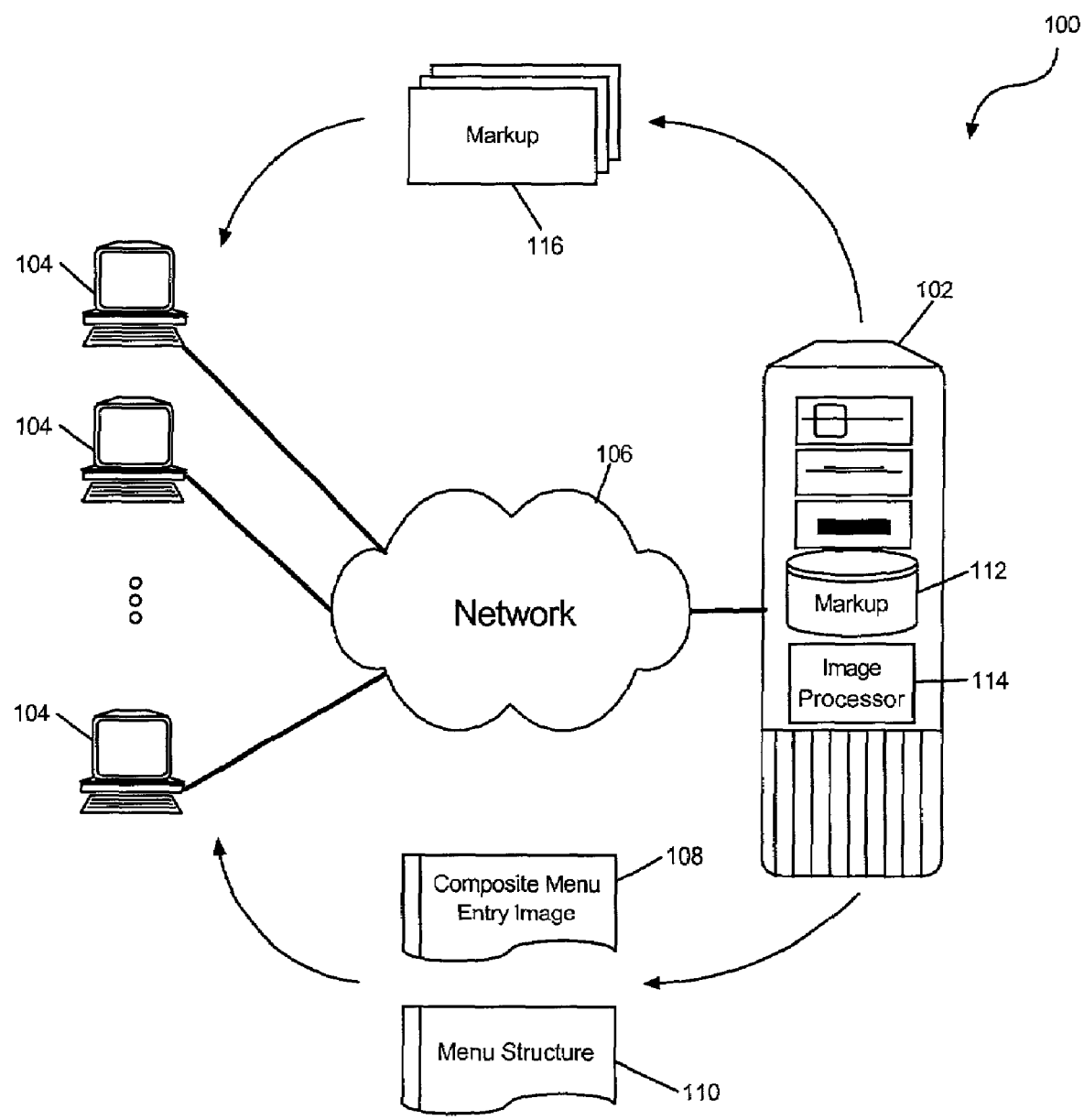
FIG. 1 is a schematic illustration of a system which has been configured to render an emulated menu in a content browser in accordance with the inventive arrangements; and, FIGS. 2A and 2B, taken together, are a pictorial illustration of an exemplary emulated menu bar of the present invention; and, FIGS. 3A and 3B, taken together, are a pictorial illustration of an exemplary emulated pop-up menu of the present invention.

FIG. 1 is a schematic illustration of a system 100 which has been particularly configured to dynamically create and render an emulated menu in a content browser. The system can include a content server 102 and one or more client computers 104, communicatively linked to the content server 102 via a computer communications network 106, for example the Internet. A content browser such as a Web browser (not shown) can operate within each client computer 104. As is well known in the art, content browsers can load and render markup such as markup 116 contained in Web pages, XML documents, and the like. The content server 102, by comparison, can store markup 116 in fixed storage 112, the markup 116 being contained in documents such as Web pages which can be "served" to requesting clients such as clients 104.

In accordance with the inventive arrangements, the markup 116 can include therein markup tags specifying a form. As is well-known in the art, forms can include submittable input elements which, responsive to the selection thereof, can transmit encoded data to a specified network address. In the HTML specification, for example, data contained in a form can be transmitted to a specified network address in a hypertext transfer protocol (HTTP) request. Importantly, each form-based submittable input element can have a visual representation defined by a specified image. In this regard, a collection of form-based submittable input elements can have a corresponding visual representation and an arrangement which emulates that of a conventional menu bar.

Figure 2A:
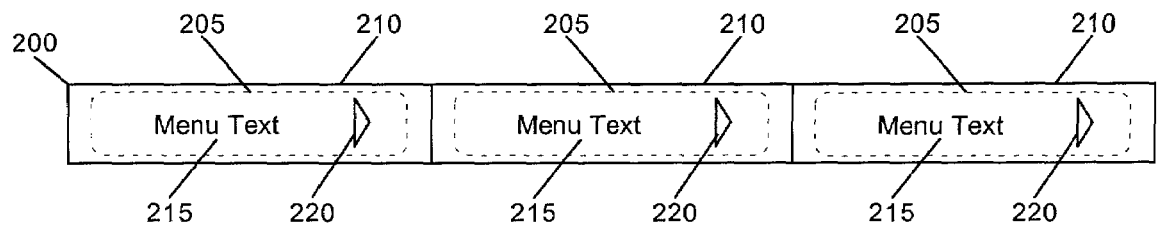
Figure 2B:
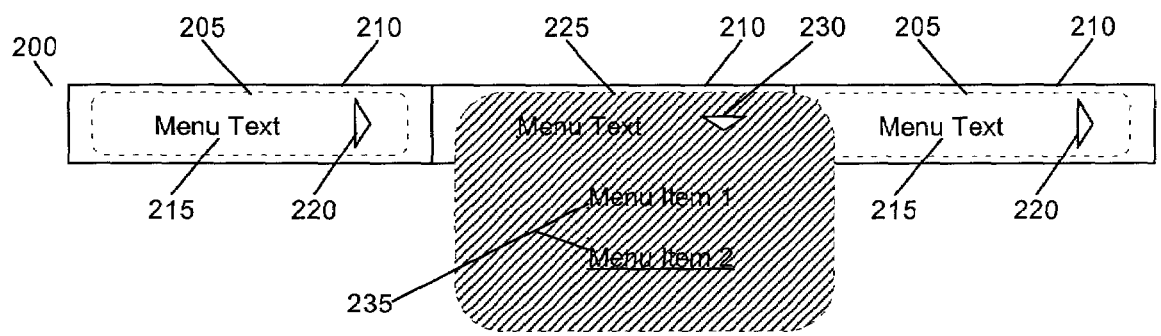

In one aspect of the present invention, a table can be included in the markup 116 wherein each cell in a top row of the table can include a menu entry. As in the case of a conventional menu bar, each menu entry, upon activation, can cause the display of a drop-down list of menu items. FIG. 2A depicts the visual rendering of the emulated menu bar in a table 200. Specifically, as shown in FIG. 2A, the table 200 can include table cells 210 for each menu entry. Each table cell 210 can further include a form-based input element 205 generated in accordance with the inventive arrangements. The form-based input element 205 can emulate a menu entry in a menu bar. In particular, each form-based input element 205 can include a textual description portion 215 and an iconic portion 220 which indicates whether an associated drop-down menu has been activated.

Each composite image used to visually represent the form-based input elements 205 can be assembled through an inventive use of the <INPUT type=IMAGE> tag. The <INPUT type=IMAGE> tag permits the use of any arbitrary image as a submittable HTML element. Importantly, as will be apparent to one skilled in the art, images specified by the markup tag, <INPUT type=IMAGE>, can contain text, colors and styles typically not provided by other submittable HTML elements. In fact, the submittable HTML element, BUTTON, as defined by version 3.2 of the HTML specification, cannot accommodate such a wide variety of display parameters without also requiring additional client-side processing often provided by executable scripts and the like. An example of markup utilizing the INPUT TYPE=IMAGE operation in a table follows:

```
<FORM>
    <TABLE>
        <TR>
            <TD>
                <INPUT TYPE="image" SRC="http://my.graphics.com/
```

-continued

```
            graphic.gif"
            NAME="imgsub" ALIGN="top" WIDTH="50"
            HEIGHT="50">
         </TD>
      </TR>
   </TABLE>
</FORM>
```

Returning now to FIG. 1, when a user selects a menu entry, a form-based submit can be provided to the server 102. In response, the server 102 can provide to the content browser a visual representation of a drop-down menu structure 110. The drop-down menu structure 110 can replace the selected form-based input element 205 of FIG. 2A with the drop-down menu structure 225. The drop-down menu structure 225, like the form-based input element 205, can include a visual representation produced through the inventive use of the <INPUT TYPE=IMAGE> markup operation. Preferably, the image can include an icon 230 which indicates that the drop-down menu has been activated. Additionally, those menu-items 235 included in the drop down menu can include visually distinguishing characterization, such as underlining, in order to indicate that the user can select the menu-items 235. Finally, to assist in the menu bar emulation, the background coloring of the table cell 210 can be changed to a color which differs from the background coloring of the other table cells.

Aside from drop-down menus in menu bars, the present invention can accommodate pop-up menus. In particular, conventional pop-up menus can be activated through a mouse-driven right click operation. When performed in a content browser, however, a mouse-driven right click operation can invoke a pop-up menu containing menu items for invoking content browser specific operations and not application specific operations. Nevertheless, the present invention can emulate pop-up menus by providing a graphical indication when an object has an associated pop-up menu.

Figure 3A:
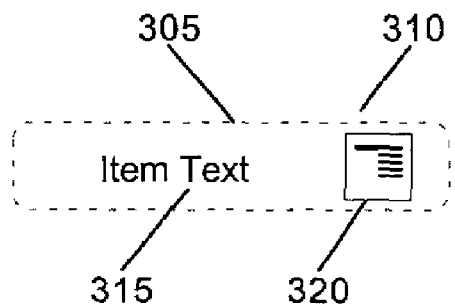
Figure 3B:
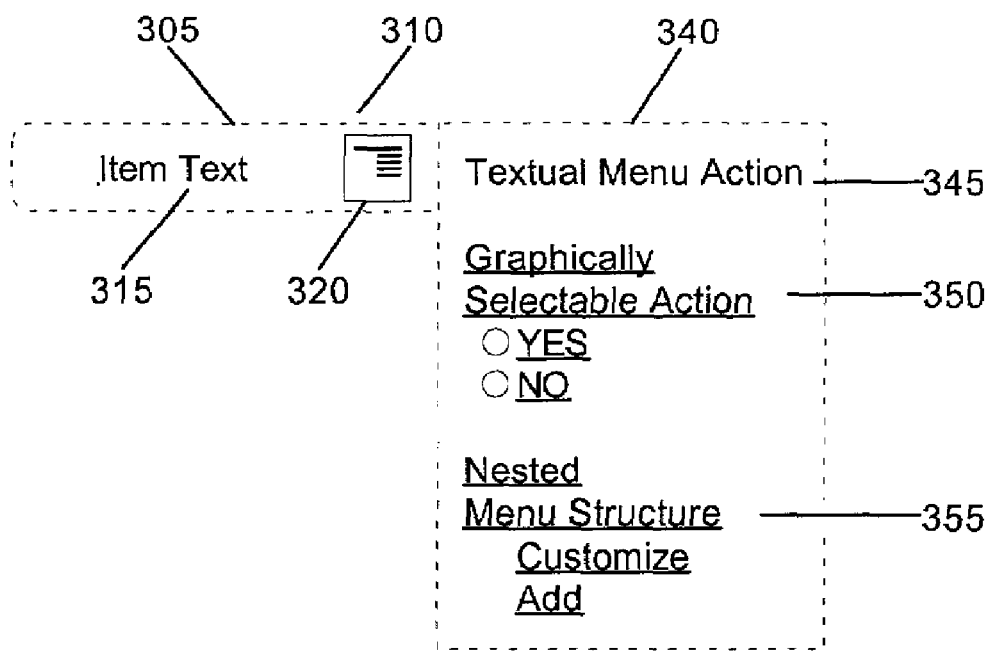

Specifically, as shown in FIG. 3A, a form-based input element 305 configured in accordance with the inventive arrangements can be included in markup. The form-based input element 305 can include a visual representation formed from the composite imagery of the object text 315 and the icon 320, the combination forming a pop-up menu 310. As shown in FIG. 3B, upon selection, a form-based submit can be performed and a menu-structure 340 can be provided adjacent to or in place of the pop-up menu 310. In this way, a conventional pop-up menu can be emulated without requiring the processing of a client-side script. Rather, the technique employed herein can be deployed in even the most skeletal of content browsers which support only HTML 3.2.

Importantly, as illustrated in FIG. 3B, the emulated menus of the present invention (both pop-up and drop-down) can support many types of menu items, including textual menu actions 345, graphically selectable menu actions 350, and nested menu structures 355. Textual menu actions 345 are similar to menu tasks which, upon selection, can generate an HTTP request. Accordingly, textual menu actions 345 can be implemented using a form-based input element where only text is used as an image. Graphically selectable menu actions 350, by comparison, indicate the availability of a selection from among a list of menu items. Where a single selection from among multiple menu items is required, radio buttons can be included in the form-based input element. In contrast, where multiple selections from among multiple menu items are possible, checkboxes can be included in the form-based input element.

In accordance with the inventive arrangements, the state of each menu entry in a menu bar or pop-up menu can be stored. In particular, since each menu entry can be a form-based input element having a dynamically customizable visual representation, the state of each form-based input element can be preserved as would be the case with a conventional form-based input element such as a radio button or text field. In consequence, each time a menu-item or entry has been selected, it can be determined whether a drop-down menu or pop-up menu has been activated. If it is determined that a drop-down menu or pop-up menu has already been activated when another menu item or entry has been selected, the already activated drop-down menu or pop-up menu can be deactivated. In this way, the operation of the emulated menus of the present invention can remain true to conventional menu bars and pop-up menus.

The present invention can be realized in hardware, software, or a combination of hardware and software. A method and apparatus for emulating a menu in a content browser according to the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A menu emulation method comprising:
   encoding a form-submit element with a menu-item description and an associated graphical icon denoting a selectable menu;
   disposing said encoded form-submit element in network distributable markup and distributing said markup to a content browser; and,
   responsive to a selection of one of said menu-item description and said graphical icon, further distributing over said network to said content browser a graphical menu-structure encoded in at least one additional form-submit element.

2. The menu emulation method of claim 1, wherein said encoding step comprises:
   embedding in a markup representation of said form-submit element, a network reference to a server configured to produce enhanced graphical menu images, said network reference comprising a textual menu-item description and a menu type.

3. The menu emulation method of claim 1, wherein said disposing step comprises:
embedding said encoded form-submit element in network distributable markup defining a table cell in a table;
formatting said table cell with a background color matching the background colors of other table cells in said table; and,
distributing said markup, upon request, to a content browser.

4. The method of claim 3, wherein said step of further distributing a graphical menu-structure comprises:
responsive to a selection of said encoded form-submit element embedded in said table cell, assembling a graphical menu-structure encoded in at least one additional form-submit element;
replacing said encoded form-submit element embedded in said table cell with said graphical menu-structure; and,
formatting said table cell with a background color which differs from the background colors of other table cells in said table.

5. The menu emulation method of claim 1, wherein said disposing step comprises:
embedding said encoded form-submit element in network distributable markup defining a table cell in a table row in a table;
further embedding other encoded form-submit elements in other table cells in said table row; and,
formatting each said table cell with a first background color.

6. The menu emulation method of claim 5, wherein said further distributing step comprises:
detecting a selection of one of said encoded form-submit elements in said row;
responsive to said detection, assembling a graphical menu-structure encoded in at least one additional form-submit element;
replacing said one of said encoded form-submit elements with said graphical menu-structure; and,
formatting a table cell containing said graphical menu-structure with a background color which differs from the background colors of said other table cells in said table row.

7. The method of claim 4, wherein said assembling step comprises generating a graphical display of a menu-structure, said display comprising at least one of a textual menu action, a graphically selectable menu action, and a nested menu structure.

8. The method of claim 6, further comprising:
preserving state information for each encoded form-submit element; and,
upon detecting a selection of one of said encoded form-submit elements, identifying graphical menu-structures in said markup from said state information, and removing said graphical menu-structures from said markup except for a graphical menu-structure assembled for said selected encoded form-submit element.

9. A menu emulation method comprising:
serving markup to a plurality of content browsers, said markup comprising at least one form-based input element encapsulating a reference to a composite image of menu text and a graphical icon, said icon denoting a selectable menu;
receiving an indication from at least one of said content browsers that said form-based input element has been selected; and,
responsive to said receipt of said indication, further serving to said at least content browser a graphical image of a menu structure, said graphical image comprising at least one form-based input element encapsulating a reference to a composite image of menu text and a graphical icon, said icon denoting at least one of a menu action and a selectable menu.

10. A machine readable storage having stored thereon a computer program for performing menu emulation, said computer program comprising a routine set of instructions for causing the machine to perform the steps of:
serving markup to a plurality of content browsers, said markup comprising at least one form-based input element encapsulating a reference to a composite image of menu text and a graphical icon, said icon denoting a selectable menu;
receiving an indication from at least one of said content browsers that said form-based input element has been selected; and,
responsive to said receipt of said indication, further serving to said at least content browser a graphical image of a menu structure, said graphical image comprising at least one form-based input element encapsulating a reference to a composite image of menu text and a graphical icon, said icon denoting at least one of a menu action and a selectable menu.

* * * * *